United States Patent
Edgecombe

(10) Patent No.: US 7,435,462 B2
(45) Date of Patent: Oct. 14, 2008

(54) THERMOPLASTIC ARTICLE WITH A PRINTABLE MATTE SURFACE

(75) Inventor: Brian Edgecombe, Hopewell, NJ (US)

(73) Assignee: Arkema France, Colombes (FR)

( * ) Notice: Subject to any disclaimer, the term of this patent is extended or adjusted under 35 U.S.C. 154(b) by 390 days.

(21) Appl. No.: 11/123,539

(22) Filed: May 6, 2005

(65) Prior Publication Data
US 2005/0266182 A1 Dec. 1, 2005

Related U.S. Application Data

(60) Provisional application No. 60/575,618, filed on May 28, 2004.

(51) Int. Cl.
*B41M 5/40* (2006.01)
(52) U.S. Cl. ............... 428/32.34; 428/402; 428/473.5; 428/480; 428/500
(58) Field of Classification Search ............ 428/32.34, 428/402, 473.5, 480, 500
See application file for complete search history.

(56) References Cited

U.S. PATENT DOCUMENTS

| | | | |
|---|---|---|---|
| 3,154,461 A * | 10/1964 | Johnson | 428/159 |
| 4,906,676 A | 3/1990 | Ida | |
| 5,215,817 A | 6/1993 | Chu | |
| 5,308,666 A * | 5/1994 | Borchardt | 428/35.2 |
| 5,346,954 A | 9/1994 | Wu et al. | |
| 5,928,778 A * | 7/1999 | Takahashi et al. | 428/323 |
| 6,025,059 A | 2/2000 | McGee et al. | |
| 6,251,512 B1 * | 6/2001 | Gustafson et al. | 428/323 |
| 6,303,067 B1 * | 10/2001 | Wong et al. | 264/289.6 |
| 6,524,694 B1 | 2/2003 | Phillips | |
| 6,703,141 B1 | 3/2004 | Lu et al. | |
| 6,844,374 B2 * | 1/2005 | Jin et al. | 522/79 |
| 2001/0036543 A1 * | 11/2001 | Sparks et al. | 428/215 |
| 2003/0175499 A1 | 9/2003 | Phillips | |

FOREIGN PATENT DOCUMENTS

| | | |
|---|---|---|
| EP | 0607783 | 1/1994 |
| EP | 607783 A2 * | 7/1994 |
| EP | 1022115 | 1/2001 |
| JP | 2001/081266 | 3/2001 |

OTHER PUBLICATIONS http://products3.3m.com/catalog/us/en001/manufacturing__industry/paint_coatings/node__XLV3FCZ0GWge/root__GST1T4S9TCgv/vroot__Q0SJ3LJK63ge/theme__us__paintcoatings__3__0/command__AbcPageHandler/output__html, Jan. 1, 2006.*

* cited by examiner

*Primary Examiner*—Bernard Lipman
(74) *Attorney, Agent, or Firm*—Thomas F. Roland

(57) ABSTRACT

This invention relates to thermoplastic articles having printable matte surfaces. The printable matte surface is achieved by blending inorganic particles, and especially silica particles, having a mean particle size of from 2 to 30 micron and a narrow particle size distribution into the thermoplastic at from 15 to 30 percent by weight.

6 Claims, No Drawings

THERMOPLASTIC ARTICLE WITH A PRINTABLE MATTE SURFACE

This application claims benefit under U.S.C. §119(e) of U.S. provisional application 60/575,618, filed May 28, 2004.

FIELD OF THE INVENTION

This invention relates to thermoplastic articles having printable matte surfaces. In particular, the printable matte surface is achieved by blending inorganic particles, and especially silica particles, having a specific particle size and particle size distribution into the thermoplastic.

BACKGROUND OF THE INVENTION

Thermoplastics are useful in the manufacture of many articles since they can be easily molded into a variety of shapes, they form hard and durable articles, and there is excellent flexibility for designs and fabrications at a competitive cost.

Controlling the gloss level of polymeric articles is important for many applications. For some polymeric materials such as acrylics, high gloss articles can be readily obtained, but low gloss or matte articles that retain their gloss levels upon subsequent processing (e.g. thermoforming) are more difficult to obtain. Often other properties, such as surface roughness and mechanical toughness are altered significantly by the matting process.

One method for obtaining matte thermoplastic articles involves the mechanical embossing of a pattern onto an article, such as by sand blasting or surface pattern fabrication. Articles made by this approach can have a low-gloss surface but typically do not maintain their gloss levels upon subsequent processing such as thermoforming or lamination onto a substrate.

Another approach for obtaining a matte finish involves the deposition of a coating or paint onto an article. A matting agent in the coating formulation provides the low-gloss surface to the article. However, this approach is not cost effective because of the need to cure and dry the coating.

Still another approach relies upon the modification of the thermoplastic resin by the addition of inorganic or organic particle of the appropriate size and refractive index. Organic particles have been used to reduce the gloss on the surface of a thermoplastic, as described in European patent EP 1022115, U.S. Pat. No. 5,346,954, and JP 2001081266. The use of organic polymeric particles produces a matte finish, but they can be difficult to make and therefore expensive. Furthermore, the handling of fine powder of organic polymer is more likely to create conditions for dust explosions than in the case of handling some silica powders.

Inorganic fillers have also been used to incorporate a matte finish on thermoplastic articles. Unfortunately, these inorganic particles, such as, barium sulfate, calcium carbonate, titanium dioxide, silica, etc. are normally difficult to disperse evenly in polymer matrix material. They also tend to reduce greatly the light transmission of the polymer, and do not generate the desired surface texture. Additionally, the filler particles have a tendency to deteriorate physical properties of the polymer.

Fine particles (i.e. less than 15 micrometers) of a copolymer made by an emulsion polymerization process are sometimes added into a plastic matrix to generate a light diffusion effect for display and light panel applications, for example, U.S. Pat. No. 5,346,954. However, this type of product tends to soften the polymer matrix and cannot produce the textured surface so often preferred by the end user.

U.S. Pat. No. 4,906,676 describes the use of silica or glass particles in thermoplastics for an optical effect. The particles are surface treated with silane compounds to render the surface hydrophobic, and thereby improve the dispersibility of the particle in the thermoplastic matrix.

The disadvantages of current approaches to producing a matte surface on a thermoplastic include: a general loss in mechanical properties (e.g. toughness); and introduction of surface roughness. In some applications such as writing or printing onto an article, roughness can be detrimental to image transfer. By choosing particles with a mean diameter<10 microns, these 2 problems can be minimized. U.S. Pat. No. 6,524,694 and Patent application Number 20030175499 describe the use of inorganic particles, such as boron nitride and silicates in extruded thermoplastics. However, in order to obtain good dispersibility a dispersing agent is required and low loading of from 0.01 to 15 weight percent. The presence of a dispersing agent can decrease the mechanical properties of the thermoplastic.

Inorganic particles with diameter<1 micron, such as micronized silica, often cause fouling of the melt-processing equipment by accumulation of deposits. Therefore, an optimum range of mean particle diameter exists in order to obtain low gloss and sufficiently low-roughness.

There is a need for a method of providing an advantageous balance of low-gloss, printability, and low migration or "plate-out", without the need for added dispersants or particle surface coatings which add expense and may negatively effect the mechanical properties of the thermoplastic. Presently, there is not a successful plastic product in this market that can be used in a one-step process and provide the properties and appearance needed to replace sand blasted glass material.

Surprisingly it has been found that adding inorganic alkali alumina silica particles, with particle size from 2 to 20 microns, and having a narrow particle size distribution produces a matte finish, without surface roughness. Melt processing or forming (extrusion, lamination, thermoforming) of such materials yields a printable article (film, sheet, laminate) with a low-gloss appearance. The use of silica particles having the particle size and particle size distribution of the invention allows for a higher loading of particles, without the need for a surface treatment or added dispersants.

SUMMARY OF THE INVENTION

It is an object of the invention to provide a matte or low-gloss finish on a thermoplastic article without high surface roughness. The surface should feel smooth.

It is a further object of the invention to provide a printable surface on a thermoplastic article.

Another object of the invention is to provide an efficient one-step method for adding printability and a low-gloss matte surface to a thermoplastic and articles formed from the thermoplastic.

The objectives of the invention are achieved, in accordance with the principles of a preferred embodiment of the invention, by a thermoplastic article having a matte, printable surface comprising from 15 to 30 percent by weight of inorganic particles. The particles preferably have a mean particle size between 2 and 20 microns.

DETAILED DESCRIPTION OF THE INVENTION

The invention relates to thermoplastic articles having printable matte surfaces. The printable matte surface is achieved by blending inorganic silica particles, having a specific particle size and particle size distribution into the thermoplastic.

The thermoplastic matrix may be any thermoplastic, including, but not limited acrylonitrile butadiene styrene (ABS) terpolymer, acrylonitrile-styrene-acrylate (ASA) terpolymer, polycarbonate, polyester, polyethylene terephthalate-glycol modified (PETG), methylmethacrylate-butadiene-styrene (MBS) copolymer, high impact polystyrene (HIPS), acrylonitrile/acrylate copolymer, polystyrene, styrene acrylonitrile (SAN), methylmethacrlate-styrene (MMA/S) an acrylonitrile/methyl methacrylate copolymer, impact modified polyolefins, polyvinyl chloride (PVC), impact modified PVC, imidized acrylic polymer, fluoropolymers, polyvinylidenedifluoride (PVDF), PVDF-acrylic polymer blends, (meth)acrylic polymer or impact modified (meth) acrylic polymer. Preferred thermoplastics are acrylics, including impact modified (meth)acrylics, and (meth)acrylic copolymers. Especially preferred are homopolymers or copolymers comprising methyl methacrylate.

The inorganic particles useful in the invention have a median particle size of from 2 to 20 microns, preferably from 2 to 12 microns, and most preferably from 3 to 8 microns. It was found that particle sizes over 20 microns produced a surface that was so rough as to make printing difficult. A particle size distribution of the matting agent particles can be evaluated by fractionating particles of different sizes and weigh each fraction. The $95^{th}$ percentile particle size is the size that 95 percent by weight of the particles are below. In order to minimize the surface roughness, the matting agent should have a $95^{th}$ percentile particle size that is less than 40 microns, preferably, less than 30 microns and most preferably less than 15 microns.

Useful inorganic particles include, but are not limited to calcium sulfates, talc, silicates, silicas, mica, titanates, metal sulfates, metal carbonates, metal oxides, borides, boron nitrides, ceramics, and mixtures thereof. Preferred inorganic particles include silica, alumina, talc, metal carbonates, or mixtures thereof. Preferred inorganic particles are alkali alumina silica. In one embodiment, alkali aluminumsilicate particles were those having a mean diameter 4 microns, $95^{th}$ percentile of particle size distribution is 13 microns.

The inorganic particles are present at from 15-30 percent by weight in the thermoplastic article. More preferably the inorganic particles are present at from 16 to 23 percent by weight. When particles were present below 15 percent by weight, the thermoplastic had a gloss level that was too high.

Thermoplastic articles of the invention are formed by means known in the art, such as molding, blow-molding, extrusion, coextrusion, melt cast extrusion, lamination, thermoforming. The article may be a sheet, a film, a laminate, a rod, cone or other shaped thermoplastic. The thermoplastic may be multi-layered, or a single layer.

The particles may be added to the thermoplastic by methods known in the art. This includes adding the particles at any of the feed ports in an extrusion or molding line. Adding inorganic particles during the extrusion process provides a flexible and low cost process. It also provides a low cost of transitioning from one product to another. The particles are mixed into the thermoplastic in a homogeneous manner by the turbulence of the process. Alternatively, the particles may be mixed with the thermoplastic near the end of, or after the polymerization process. The particles and thermoplastic are then formed into pellets used as raw materials in extrusion or molding processes. The particles are added to the thermoplastic without the need for dispersants, as required in the art. Homogeneity is obtained by an appropriate profile of mixing and shear stresses in the extrusion process.

In addition to the thermoplastic and inorganic particles, other typical additives may be added to the thermoplastic composition prior to, or during extrusion and/or molding. These include mold-release agents, impact modifiers, lubricants, dyes and colorants. While the mold release agents and lubricants added to improve processing of the thermoplastic may also act as dispersants, the mold release agents and lubricants are not necessary to ensure good mixing and dispersability of the inorganic particles.

The thermoplastics of the invention have low-gloss, low surface roughness, good light transmittance, and good processability. Uses of such thermoplastics include production of articles such as films, sheets, co-extruded sheets, molded articles. These articles can undergo subsequent process such as printing, decorating, embossing, laminating, etc.

The preferred embodiments of our invention will be exemplified by the following examples. One skilled in the art will realize that minor variations outside the embodiments stated herein do not depart from the spirit and scope of this invention.

EXAMPLES

Formulations of polymer resin were prepared using the components and proportions described in Table 1. The matting agents used in the examples vary slightly in median particle size and more significantly in the particle size distribution as described in Table 2. The components were mixed by melt extrusion using conditions to obtain homogenous mixtures. The resulting resins were converted into films with thickness=0.003" by melt extrusion onto a polished roll or rolls. The film samples were evaluated for gloss value and surface roughness. Gloss values were determined using the BYK Gardner Micro-Haze Plus gloss meter.

Although the literature claims that matting agents with an average particle size in the range of 1-10 microns is preferred in order to obtain a surface with low roughness, typical matting agents have a broad distribution of particle sizes. Therefore, a significant fraction (>5 wt. %) of the particles are larger than 15 microns. The films of Example 1-5 show a range of gloss and roughness behaviors as summarized in Table 3. For applications such as printing onto film, a low roughness and low surface gloss is desired (preferably Gloss Value<23 at the 60-degree-geometry). The use of the matting agent with the narrow particle size distribution (Alkali Alumina Silica #1) yields a film with low toughness and low gloss.

TABLE 1

| Components | Example 1 (Comparative) | Example 2 (Comparative) | Example 3 (Comparative) | Example 4 | Example 5 |
|---|---|---|---|---|---|
| Acrylic Copolymer | 80.8% | 84.8% | 80.8% | 80.8% | 84.8% |
| Matting | | | | 19% | 15% |

TABLE 1-continued

| Components | Example 1 (Comparative) | Example 2 (Comparative) | Example 3 (Comparative) | Example 4 | Example 5 |
|---|---|---|---|---|---|
| Agent 1 Matting Agent 2 | | | 19% | | |
| Matting Agent 3 | 19% | 15% | | | |
| Stearyl Alcohol | 0.2% | 0.02% | 0.2% | 0.2% | 0.2% |

TABLE 2

| Matting Agent | Composition | Median Diameter of Particle (microns) | 95th Percentile* (microns) |
|---|---|---|---|
| 1 | Alkali alumina silica | 4 | 10 |
| 2 | Alkali alumina silica | 4 | 18 |
| 3 | Alkali alumina silica | 8 | 30 |

*Particle Diameter for which 95% of particles are smaller.

TABLE 3

| Film Sample | Gloss (60 degrees) | Roughness Ranking (1 = low roughness, 5 = high roughness) |
|---|---|---|
| Example 1 | 16 | 4 |
| Example 2 | 22 | 4 |
| Example 3 | 19 | 3 |
| Example 4 | 19 | 1 |
| Example 5 | 26 | 1 |

What is claimed is:

1. A thermoplastic article having a matte, printable surface comprising a blend of at least one thermoplastic resin and from 15 to 30 percent by weight of inorganic particles, based on the weight of the surface layer, and wherein said particles have a mean particle size of from 2 to 12 microns, and have a particle size distribution wherein the 95$^{th}$ percentile particle size is less than 20 microns, wherein said thermoplastic is selected from the group consisting of acrylonitrile butadiene styrene (ABS) terpolymer, acrylonitrile-styrene-acrylate (ASA) terpolymer, polycarbonate, polyester, polyethylene terephthalate-glycol modified (PETG), methylmethacrylate-butadiene-styrene (MBS) copolymer, high impact polystyrene (HIPS), acrylonitrile/acrylate copolymer, polystyrene, styrene acrylonitrile (SAN), methylmethacrlate-styrene (MMA/S), an acrylonitrile/methyl methacrylate copolymer, impact modified polyolefins, polyvinyl chloride (PVC), impact modified PVC, imidized acrylic polymer, fluoropolymers, polyvinylidenedifluoride (PVDF), PVDF-acrylic polymer blends, (meth)acrylic polymer and impact modified (meth)acrylic polymer.

2. The thermoplastic article of claim 1 wherein said thermoplastic is a homopolymer or copolymer comprising methyl methacrylate.

3. The thermoplastic article of claim 1 wherein said inorganic particles are selected from the group consisting of silica, talc, alumina, metal carbonates, and mixtures thereof.

4. The thermoplastic article of claim 1 wherein said inorganic particles are alkali aluminumsilicate.

5. The thermoplastic article of claim 1 wherein said inorganic particles have a mean particle size of from 3 to 8 microns.

6. The thermoplastic article of claim 1 wherein said particle size distribution wherein the 95$^{th}$ percentile particle size is less than 15 microns.

* * * * *